US011368368B2

(12) United States Patent
Reale et al.

(10) Patent No.: US 11,368,368 B2
(45) Date of Patent: Jun. 21, 2022

(54) SEGMENTING A CORPORATE COMMUNICATIONS NETWORK

(71) Applicant: Hive Streaming AB, Stockholm (SE)

(72) Inventors: Riccardo Reale, Stockholm (SE); Roberto Roverso, Stockholm (SE); Jonatan Bodvil, Stockholm (SE)

(73) Assignee: Hive Streaming AB

( * ) Notice: Subject to any disclaimer, the term of this patent is extended or adjusted under 35 U.S.C. 154(b) by 0 days.

(21) Appl. No.: 17/048,237

(22) PCT Filed: Apr. 17, 2019

(86) PCT No.: PCT/EP2019/059894
§ 371 (c)(1),
(2) Date: Oct. 16, 2020

(87) PCT Pub. No.: WO2019/201979
PCT Pub. Date: Oct. 24, 2019

(65) Prior Publication Data
US 2021/0105186 A1    Apr. 8, 2021

(30) Foreign Application Priority Data
Apr. 19, 2018 (SE) .................... 1850454-8

(51) Int. Cl.
*G06F 15/16* (2006.01)
*H04L 41/0893* (2022.01)
(Continued)

(52) U.S. Cl.
CPC ...... *H04L 41/0893* (2013.01); *H04L 41/0823* (2013.01); *H04L 41/12* (2013.01);
(Continued)

(58) Field of Classification Search
CPC . H04L 41/0893; H04L 41/0823; H04L 41/12; H04L 43/0811; H04L 43/0864;
(Continued)

(56) References Cited

U.S. PATENT DOCUMENTS 6,639,900 B1 * 10/2003 Anstey .................... H04L 41/12
370/254
2009/0201939 A1    8/2009 Yamamoto
(Continued)

FOREIGN PATENT DOCUMENTS

EP          3174247 A1    5/2017
JP       2009213122 A    9/2009
(Continued)

OTHER PUBLICATIONS

International Search Report and Written Opinion for International Application No. PCT/EP2019/059894, dated Jul. 4, 2019, 8 pages.
Japanese Notice of Reasons for Refusal for Japanese Application No. 2021-506053, dated Mar. 1, 2022, with translation, 5 pages.

*Primary Examiner* — Padma Mundur
(74) *Attorney, Agent, or Firm* — RatnerPrestia (57) ABSTRACT

A method performed by a network device of segmenting a corporate communications network is provided. The method comprises receiving, from a plurality of client devices in the corporate communications network, a measured value of a connectivity performance metric of a communication link over which each of the plurality of client devices has transferred data to at least one other randomly selected client device, and mapping the client devices into segments of the corporate communications network based on the measured value of the connectivity performance metric of each communication link, where two client devices communicating over a communication link having a measured value exceeding a connectivity quality measure will be mapped into a
(Continued)

same segment. Devices for segmenting a corporate communications network are also provided.

17 Claims, 7 Drawing Sheets

(51) Int. Cl.
    *H04L 41/0823* (2022.01)
    *H04L 41/12* (2022.01)
    *H04L 43/0811* (2022.01)
    *H04L 43/0864* (2022.01)
    *H04L 43/0888* (2022.01)
    *H04L 43/16* (2022.01)
    *H04L 47/2491* (2022.01)
    *H04L 47/283* (2022.01)

(52) U.S. Cl.
    CPC ...... *H04L 43/0811* (2013.01); *H04L 43/0864* (2013.01); *H04L 43/0888* (2013.01); *H04L 43/16* (2013.01); *H04L 47/2491* (2013.01); *H04L 47/283* (2013.01)

(58) Field of Classification Search
    CPC . H04L 43/0888; H04L 43/16; H04L 47/2491; H04L 47/283
    See application file for complete search history.

(56) References Cited

U.S. PATENT DOCUMENTS

2012/0054818 A1* 3/2012 Noh ................ H04N 21/25825
                                                            725/143
2015/0293756 A1* 10/2015 Wright ................ G06F 21/577
                                                            717/178
2016/0094274 A1* 3/2016 Sundaresan ......... H04L 43/0888
                                                            375/257

FOREIGN PATENT DOCUMENTS

JP          2017050703 A     3/2017
WO          2010057192 A1    5/2010

* cited by examiner

SEGMENTING A CORPORATE COMMUNICATIONS NETWORK

This application is a U.S. National Phase application of PCT International Application No. PCT/EP2019/059894, filed Apr. 17, 2019, which claims the benefit of Swedish Application SE 1850454-8, filed Apr. 19, 2018, both of which are incorporated by reference herein.

TECHNICAL FIELD

The invention relates to methods and devices for segmenting a corporate communications network.

BACKGROUND

Corporate/enterprise networks generally have a large number of endpoint nodes, such as stationary computers, laptops, mobile phones, tablets, etc., in each site or location in the network. These endpoint nodes are connected to each other via one or more routers to form sub networks within a site, and a unique local Internet Protocol (IP) address must be assigned to each endpoint node in the site.

Network topology discovery in enterprise networks is an inherently complex problem. This complexity mainly stems from the size and geographical distribution of enterprise networks. It is common for these networks to span multiple continents, countries and cities making it extremely difficult for administrators to operate, maintain and expand. On top of that, enterprise networks are often composed of multiple heterogeneous networks, due to the company's mergers and acquisitions. Every single sub-network is often built by different vendors with independent requirements, budget and security policies. It is therefore impossible in most cases to fully comprehend structure and configuration of the network across the whole organization.

In this complex environment, network topology discovery is routinely carried out by network administrators for solving issues, such as finding failed components and erroneous configurations, or for more administrative tasks, such as resource management and expansion planning.

Typically, administrators utilize for this purpose a number of layer 2 and 3 tools provided by either an equipment vendor of the network or by a third party.

However, network topology is not only useful in the context of network administration, but it is also necessary in order to optimize performance of data-intensive real time applications and services running in the network.

SUMMARY

An object of the present invention is to solve, or at least mitigate, this problem in the art and to provide an improved method of determining topology of a corporate network.

This object is attained in a first aspect of the invention by a method performed by a client device of facilitating segmenting of a corporate communications network to which the client device is connected. The method comprises transmitting data to at least one other randomly selected client device in the corporate communications network, measuring a value of a connectivity performance metric of a communication link over which the data is transferred to said at least one other client device and transmitting the measured value of the connectivity performance metric for each communication link to a network device configured to map the client device into a segment of the corporate communications network based on the measured value of the connectivity performance metric of each communication link.

This object is attained in a second aspect of the invention by a client device configured to facilitate segmenting of a corporate communications network to which the client device is connected. The client device comprises a processing unit and a memory, said memory containing instructions executable by the processing unit, whereby the client device is operative to transmit data to at least one other randomly selected client device, measure a value of a connectivity performance metric of a communication link over which the data is transferred to said at least one other client device, and transmit the measured value of the connectivity performance metric for each communication link to a network device configured to map the client device into a segment of the corporate communications network based on the measured value of the connectivity performance metric of each communication link.

This object is attained in a third aspect of the invention by a method performed by a network device of segmenting a corporate communications network. The method comprises receiving, from a plurality of client devices in the corporate communications network, a measured value of a connectivity performance metric of a communication link over which each of the plurality of client devices has transferred data to at least one other randomly selected client device, and mapping the client devices into segments of the corporate communications network based on the measured value of the connectivity performance metric of each communication link, where two client devices communicating over a communication link having a measured value exceeding a connectivity quality measure will be mapped into a same segment.

This object is attained in a fourth aspect of the invention by a network device configured to segment a corporate communications network. The network device comprises a processing unit and a memory, said memory containing instructions executable by the processing unit, whereby the network device is operative to receive, from a plurality of client devices in the corporate communications network, a measured value of a connectivity performance metric of a communication link over which each of the plurality of client devices has transferred data to another randomly selected client device, and map the client devices into segments of the corporate communications network based on the measured value of the connectivity performance metric of each communication link, where client devices communicating over a communication links having a measured value exceeding a connectivity quality measure will be mapped into a same segment.

This object is attained in a fifth aspect of the invention by a system configured to segment a corporate communications network. The system comprises at least one network device configured to segment the corporate communications network, and a plurality of client devices connected to the corporate network. Each of the plurality of client devices is configured to transmit data to at least one other randomly selected client device in the corporate network, measure, at each of the plurality of client devices, a value of a connectivity performance metric of a communication link over which the data is transferred to said at least one other client device, and transmit the measured value of the connectivity performance metric for each communication link to the network device. The at least one network device is configured to map the client devices into segments of the corporate communications network based on the measured value of the connectivity performance metric of each communication link, where two client devices communicating over a communication links having a measured value exceeding a connectivity quality measure will be mapped into a same segment.

In the invention, the client devices randomly select at least one other client device to which data is transmitted. Thereafter, each client device will measure a value of a connectivity performance metric of each communication link over which it transmits data to another client device.

In embodiments of the invention, the connectivity performance metric used is throughput, i.e. rate of successful message delivery over a communication channel, or RTT, or a combination of the two (or any other appropriate connectivity performance metric).

After having measured the connectivity performance metric value of each link over which data is transmitted to another client device, each client device reports the measured connectivity performance metric values to a network device.

The network device will make an assessment as to whether the measured connectivity performance metric value of each link exceeds a connectivity quality measure (e.g. a predetermined threshold value) or not.

If so, the two client devices communicating over the link will be mapped into the same segment. Or in other words, the two client devices will be included in the same sub network.

Advantageously, the invention implements a completely random overlay construction approach by removing any bias on the selection process of the set of peers/client devices included in the network. The client devices will then typically transmit data to other randomly selected client devices in the form of a low quality data stream to trigger transfers between neighbours and obtain measurements of the links capacity. This allows for the procurement of unbiased random measurements between client devices.

Now, without the invention, in order to make an assessment as regards network topology, one would need to have access to a network "ground truth" in the form of for instance a set of network segments, each one defined as a list of subnets with IP ranges, and their geographical location. However, such network ground truth is rarely available at all, let alone kept updated over time. Further, this information is typically limited to network segments and offices' geographical location and lacks performances metrics like band width and latency between the different offices.

In further aspects, computer programs and computer program products storing the programs are provided for causing the client device and the network device to perform the methods for facilitating segmenting of a corporate communications network in accordance with the first and the third aspects respectively.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
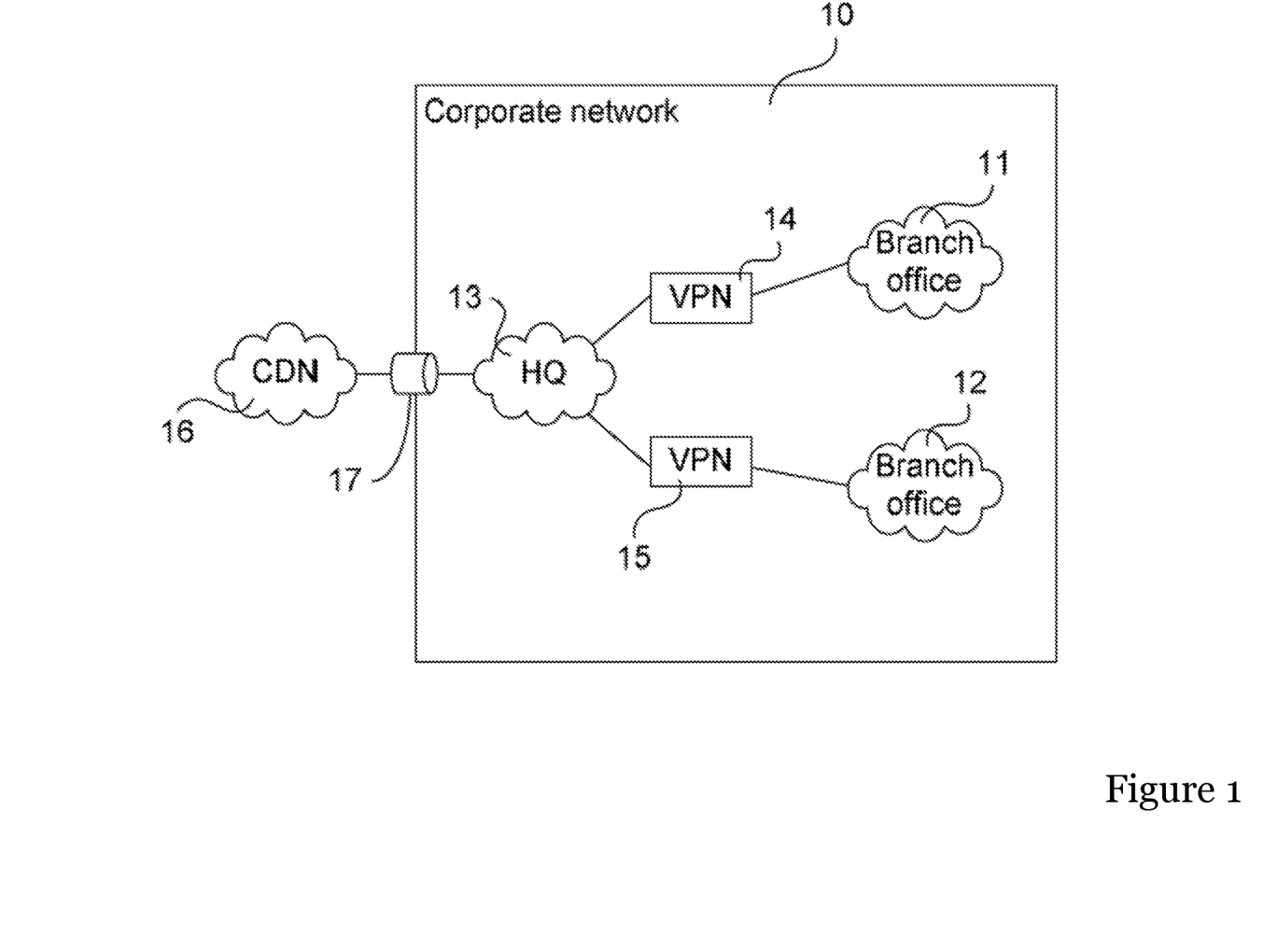
FIG. 1 illustrates a prior art corporate network in which the present invention advantageously may be implemented.

FIG. 1 illustrates a corporate communications network 10 in which the present invention advantageously may be implemented. The corporate network 10 could be setup e.g. at a corporation or a public authority where multiple sites 11, 12 representing geographically distributed offices e.g. are connected to a main site 13 via fixed Virtual Private Network (VPN) links 14, 15, respectively.

Traffic from and to the public Internet, e.g. from/to a Content Data Network (CDN) 16, may enter the corporate network 10 via a gateway (GTW) link 17 of fixed capacity connected to the main site 13. The sites 11, 12, 13 are typically arranged according to a given hierarchy within the corporate network 10. At the highest level of the hierarchy is the main site 13, typically being the head quarter (or regional head quarter) of the organization implementing the corporate network 10. For example, in a corporate setting, the main site 13 may be a regional division of a multinational corporation, while the regional sites 11, 12, may represent branch offices in the form of for instance two productions plants in that region.

In the sites, routers receive and forward packets to client nodes (not shown in FIG. 1) such as e.g. television sets, mobile phones, computers, tablets, smart phones, etc. Peer-to-peer (P2P) architectures can be used for transferring data between the routers and the client nodes, as well as between client nodes.

In the art, the topology of a corporate network is typically determined by the network administrators based on the physical structure of the network, such as understanding how local area networks (LANs), virtual networks (VNETs) and internal autonomous systems are constructed. Further, the topology is oftentimes determined based on biased decisions, which results in incorrect assumptions by the network administrators and thus non-optimized networks.

In an embodiment which will be described in the following, rather than determining the physical structure of a corporate communications network, it is proposed to determine the logical structure of the network.

That is, the invention aims at understanding how client devices running applications are organized in network segments that internally have high connectivity and high network throughput, independently of the physical interconnections between them.

That corresponds, in corporate/enterprise terms, to office locations. Besides identifying network segments, it is also interesting to know how those segments are interconnected between them in terms of connectivity and throughput, in order to identify where bottlenecks are located in the network.

The rationale behind capturing the logical structure of an enterprise network rather than the physical is that the logical structure is actually the one that dictates the behaviour of the network during the execution of the application. In P2P applications, the topological knowledge of the network is mainly used to keep traffic local to a certain network segment or between peers with high throughput, while minimizing the traffic over bottleneck links.

Hence, the invention may advantageously be applied for instance in P2P video streaming applications, peer-assisted software update distribution schemes, voice-over-IP (VoIP) systems, etc., or in any content delivery or real-time application where traffic can be engineered to exploit locality information and work around bottlenecks in the network.

Figure 2:
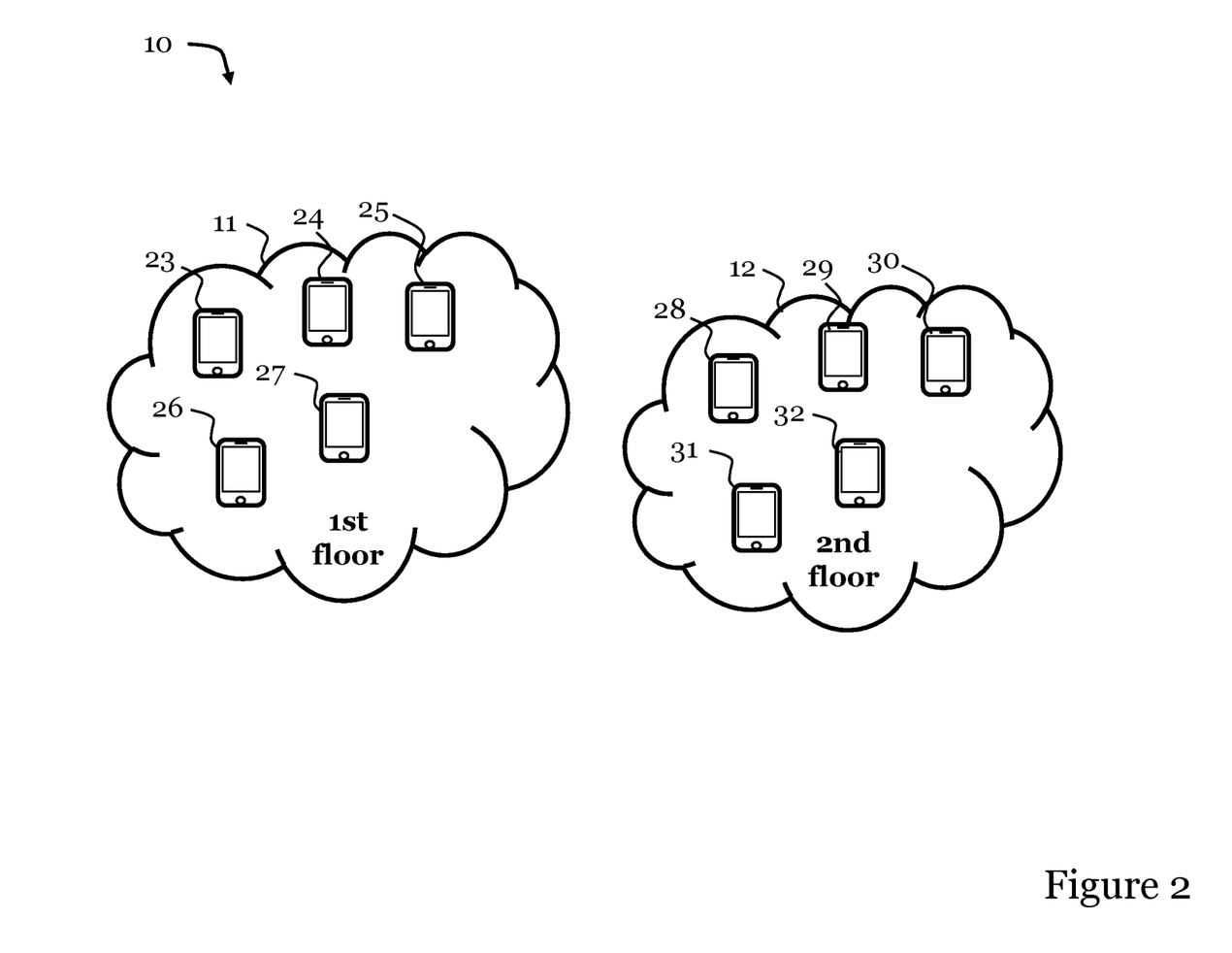
FIG. 2 shows part of a prior art corporate communications network comprising two sub networks.

FIG. 2 shows part of a prior art corporate communications network 10 comprising two sub networks 11, 12 (cf. branch networks of FIG. 1) of a company where the first sub network 11 represents a first floor within a building of the company while the second sub network 12 represents the second floor of the building.

In this example, the two sub networks 11, 12 of the corporate communications network 10 are shown to contain client devices in the form of ten smart phones 23-32. It is noted that in a real scenario, hundreds or even thousands of client devices may be incorporated in network 10, and the client devices would typically include all kinds of communication devices such as laptops, desktops, tablets, smart phones, etc.

Now, in the art, the network administrator would indeed assume that the first floor 21 and the second floor 22 shall be segmented into different sub networks due to the physical structure. The five client devices 23-27 of the sub network 11 of the first flor will thus distribute data/content among each other, while the five client devices 28-32 of the sub network 12 of the second floor will thus distribute data/content among each other. Hence, the network administrator makes a biased decision—potentially based on the erroneous assumption that connectivity among the client devices is best for devices located on the same floor in the building—which may not be optimal for segmenting the network 10.

Figure 3:
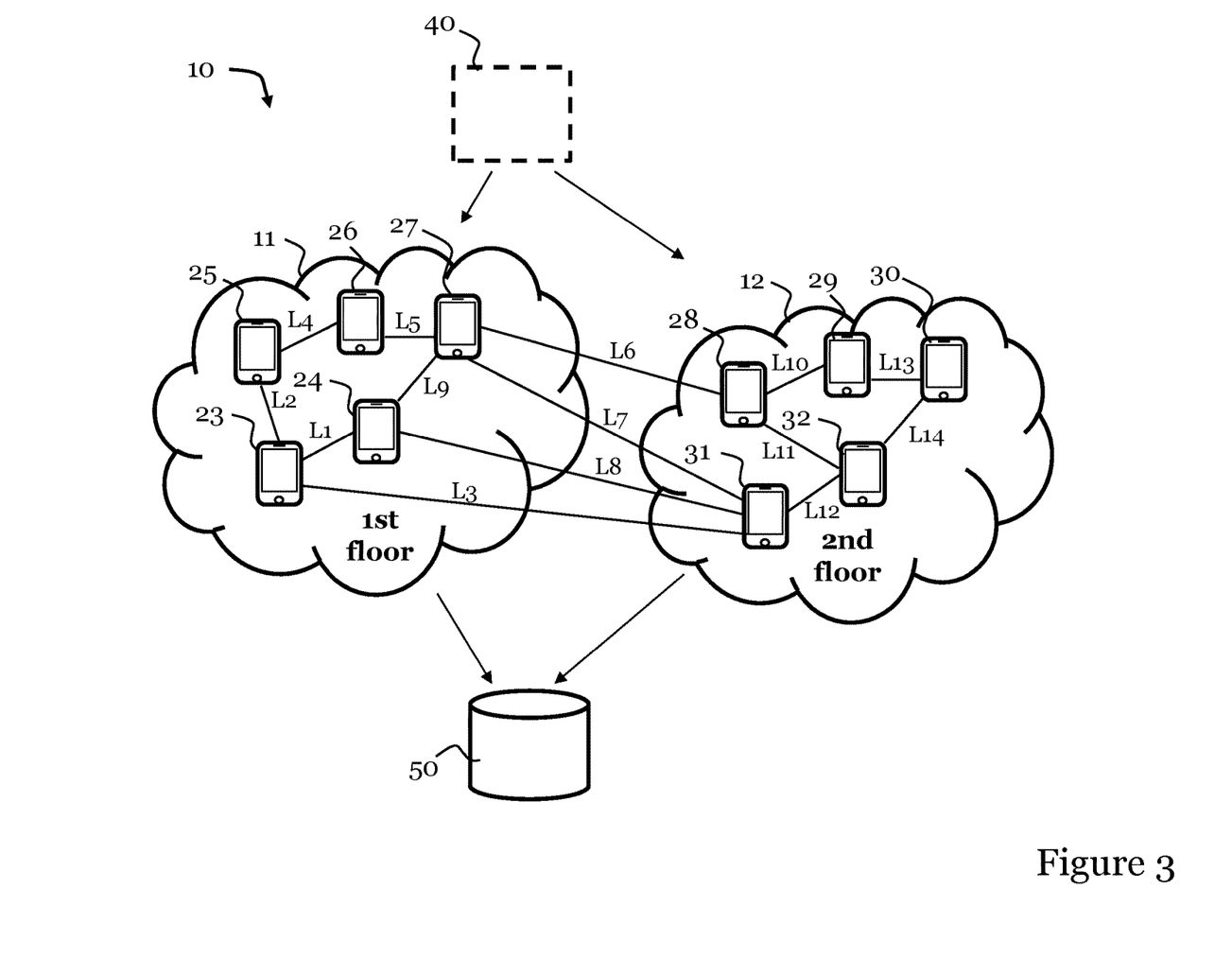
FIG. 3 illustrates an embodiment of a method of determining topology of the corporate communications network of FIG. 2.
Figure 4:
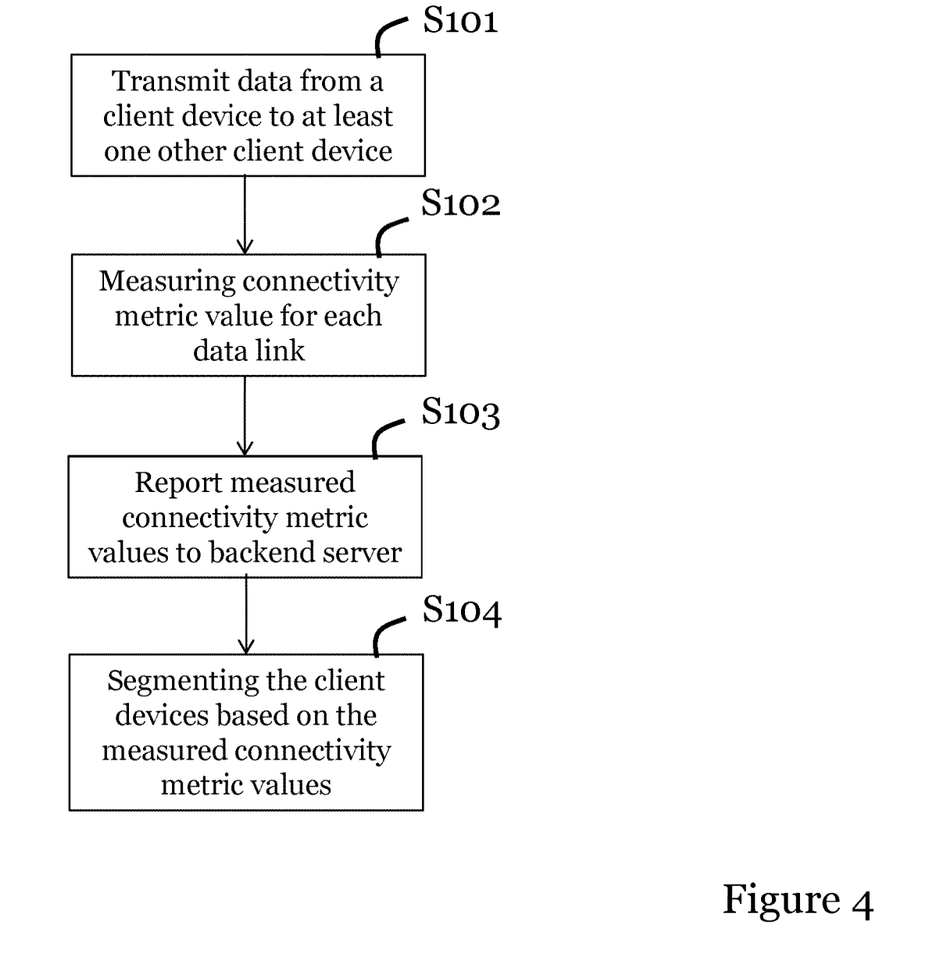
FIG. 4 illustrates the embodiment of FIG. 3 with a flowchart.

FIG. 3 illustrates an embodiment of a method of determining topology of the corporate communications network 10 of FIG. 2. FIG. 4 illustrates this embodiment with a flowchart.

Determining network topology serves the purpose of improving the performance of the P2P platform formed by the client devices 23-32. In practice, a mesh overlay network is constructed on top of the IP network.

In a P2P context, when joining the system, the client devices 23-32 are introduced to each other by a so called tracker 40 e.g. embodied by a computing device deployed in the cloud. After the introduction, each client device builds a random set of connections to other clients—its neighbours—which is used for dissemination of live information and video content. Client devices choose their neighbours by ranking the set provided by the tracker 40 according to locality information, also provided by the tracker. In a P2P system, a client device (i.e. a peer) prefers to choose client devices that are in the same network segment rather than outside of it.

Upon a content request from for instance a video player running on a client device, the client device attempts to fetch the content either from a CDN, or from the neighbouring client devices that have already downloaded it.

In an alternative embodiment, the client devices 23-32 do not form part of a P2P network, in which case the tracker 40 will be omitted. In such an embodiment, an application will run on each client device 23-32 giving each client device access to its own list of known client devices. The purpose is still the same, i.e. to improve the performance of the P2P platform formed by the client devices 23-32.

Each client device 23-32 will thus then and again randomly select one or more client device which have not been contacted yet and attempt to establish a direct connection to the randomly selected client device(s) and measure the connectivity performance metric of each communication link over which it transmits data to another client device.

The list may further be periodically refreshed with new client devices, either by making a request to the tracker or by requesting other client devices (this process is called exchange and is typical to "gossip" systems, which are fully distributed instead of centralized using a tracker).

Every client device periodically reports statistics to a backend server 50 including e.g. the average throughput and minimum Round-Trip-Time (RTT) measured fetching content from its neighbours. Also, periodically, each client device may re-evaluate its neighbours by purging the non-performing ones and selecting new ones from the tracker 40 based on locality information. By re-assessing each neighbour, the client devices make sure to discover new close client devices in terms of locality, to remove failed ones and to construct a set of neighbours that can deliver the highest throughput. This continuous process also gives rise to an emerging behaviour across all client devices which makes sure that high quality of user experience is delivered to users and that the load on the CDN is minimized; one of the main features of a P2P system is that content should be fetched from neighbouring client devices of the same segment if possible rather than turning to the CDN.

Now, with reference to FIGS. 3 and 4 in a first step S101, the client devices 23-32 randomly select at least one other client device to which data is transmitted. In one scenario, the tracker 40 sends, to each client device 23-32, a list of other client devices to which data can be transmitted. Each client device can select all or a subset of the listed devices for data transmission. The tracker 40 may randomly select client devices to be included on the list. In order to subsequently be capable of determining the network topology, each client device will typically have to communicate with many other client devices. Alternatively, each client device 23-32 runs a local application as discussed hereinabove.

Hence, a first client device (CD) 23 transmits data to a second CD 24 via link L1, to a third CD 25 via link L2 and to a fourth CD 31 via link L3.

The third CD 25 transmits data to a fifth CD 26 via link L4, which in its turn transmits data to a sixth CD 27 via link L5.

The sixth CD 27 transmits data to a seventh CD 28 via link L6 and to the fourth CD 31 via link L7.

The fourth CD 31 transmits data to the second CD 24 via link L8, which in its turn transmit data to the sixth CD 27 via link L9.

The seventh CD 28 transmits data to an eight CD 29 via link L10 and to a ninth CD 32 via link L11.

Finally, the ninth CD 32 transmits data to the fourth CD 31 via link L12, while the eight CD 29 transmits data to a tenth CD 30 via link L13 and the tenth CD 30 transmits data to the ninth CD 32 via link L14.

As is understood, in a practical realization, far more client devices are assigned to transmit data to a great number of randomly selected client devices in the corporate network 10.

Now, in this exemplifying embodiment, each client device 23-32 will in step S102 measure a value of a connectivity performance metric of each communication link over which it transmits data to another client device.

In embodiments of the invention, the connectivity performance metric used is throughput, i.e. rate of successful message delivery over a communication channel, or RTT, or a combination of the two (or any other appropriate connectivity performance metric).

In the following, a table will illustrate the measured values the connectivity performance metric used, which in this particular example is selected to be a weighted inverse of the RTT, e.g. $1 \times 10^{-3}/\text{RTT}$, where a value close to 0 represent a long RTT while a value close to 1 represents a short RTT (a value of 1 would effectively represent an RTT of 1 ms in this particular example, while a value of 0.1 would represent an RTT of 10 ms).

Alternatively, absolute values may be used for the RTT, ranging for instance from one or a couple of milliseconds to hundreds of milliseconds, where communicating client devices having low RTTs will be mapped into the same segments.

TABLE 1

Measured RTT value of each link.

| Link no. | $1 \times 10^{-3}/\text{RTT}$ |
| --- | --- |
| L1 | 0.9 |
| L2 | 0.2 |
| L3 | 0.8 |
| L4 | 0.8 |
| L5 | 0.9 |
| L6 | 0.1 |
| L7 | 0.1 |
| L8 | 0.9 |
| L9 | 0.3 |
| L10 | 1.0 |
| L11 | 0.9 |
| L12 | 0.1 |
| L13 | 0.8 |
| L14 | 0.9 |

After having measured the connectivity performance metric value, i.e. the RTT value, of each link over which data is transmitted to another client device, each client device reports the measured RTT values to the tracker 40 or to the backend server 50 in step S103; in many P2P networks, the tracker is mostly used for bootstrapping and introducing peers to each other.

The backend server 50 will thus make an assessment as to whether the measured RTT value of each link exceeds a connectivity quality measure (e.g. a predetermined threshold value) or not in step s104.

Assuming for instance that a connectivity quality threshold is set to 0.7; for any RTT value exceeding 0.7 for a given communication link, the two client devices communicating over the link will in step S104 be mapped into the same segment. Or in other words, the two client devices will be included in the same sub network.

It should be noted that in practice, setting the connectivity quality threshold to an appropriate value is complex. In the art, a graph model may be created where every graph node represents a client device and every edge represents a link whose weight corresponds to the measured quality of the link between two client devices, which graph model is evaluated to identify an appropriate threshold value.

Figure 5:
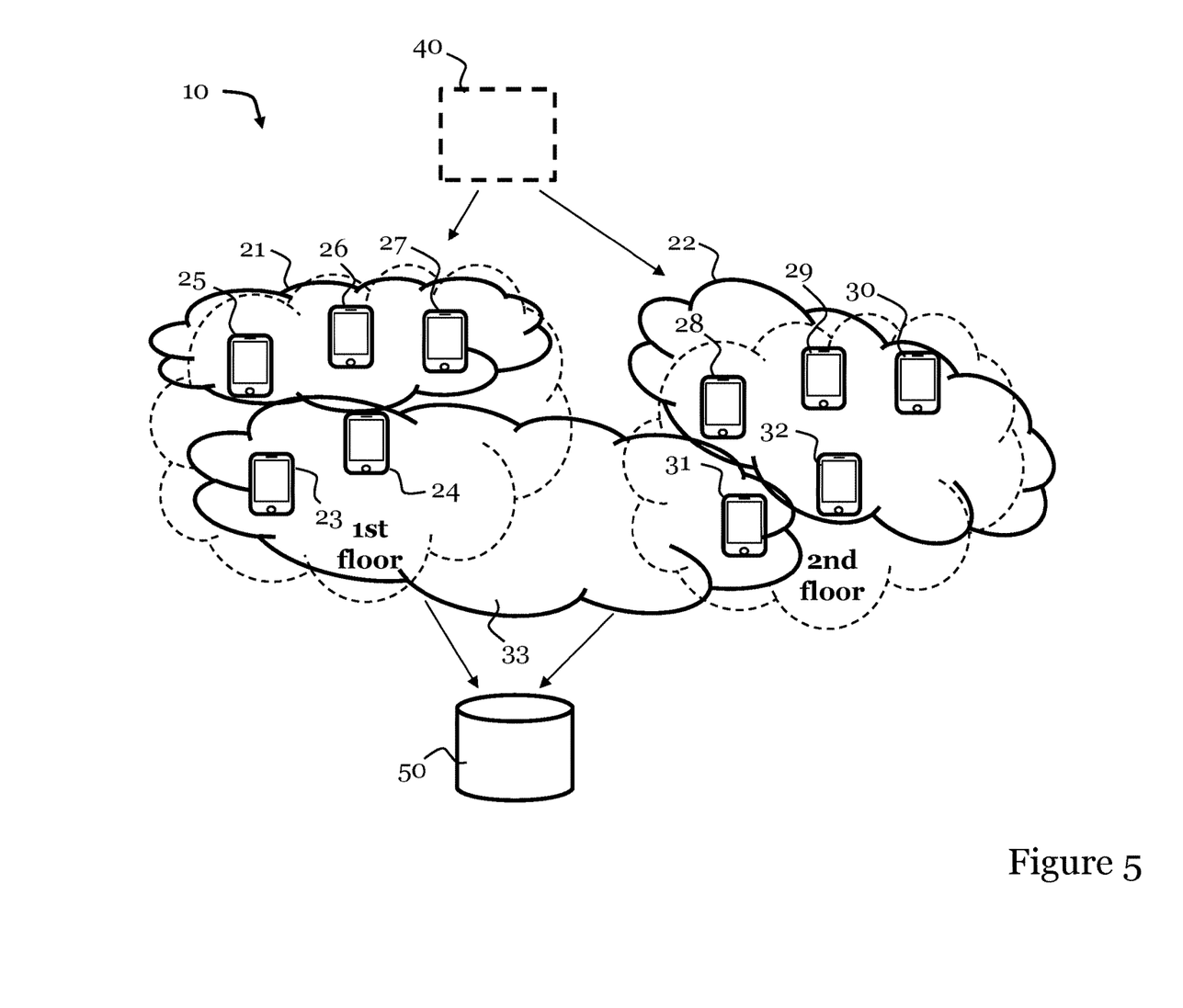
FIG. 5 illustrates a result of the method of determining network topology according to an embodiment and subsequent segmenting.

FIG. 5 illustrates a result of the method of determining network topology according to an embodiment.

Turning to Table 1, it can be concluded that links L4 and L5 have an RTT value exceeding 0.7, while neither of links L2, L6, L7 and L9 has an RTT value exceeding 0.7. As a consequence, the third CD 25, the fifth CD 26 and the sixth CD 27 will be mapped into the same segment. Hence, the third CD 25, the fifth CD 26 and the sixth CD 27 will be included in a first sub network 21.

Further, links L1, L3 and L8 have an RTT value exceeding 0.7, while neither of links L7 and L12 has an RTT value exceeding 0.7. As previously mentioned, neither of links L2 and L9 has an RTT value exceeding 0.7.

Consequently, the first CD 23, the second CD 24 and the fourth CD 31 will be mapped into the same segment. In other words, the first CD 23, the second CD 24 and the fourth CD 31 will be included in a second sub network 33.

Finally, links L10, L11, L13 and L14 have an RTT value exceeding 0.7, while neither of links L6 and L12 has an RTT value exceeding 0.7. As a result, the seventh CD 28, the eight CD 29, the ninth CD 32 and the tenth CD 30 will be mapped into the same segment. That is, the seventh CD 28, the eight CD 29, the ninth CD 32 and the tenth CD 30 will be included in a third sub network 22.

Advantageously, with the embodiment described with reference to FIGS. 3-5, a more optimal network topology has been determined.

For illustrational purposes, the old topology based on biased information shown in FIG. 2 is shown with dotted lines in FIG. 5.

As can be concluded, even though the client devices 23-27 all are located on the first floor they will not be segmented into the same sub network when taking into account the measured RTT values following the random assignment of data transmission among the client devices.

Moreover, even though the client devices 28-32 all are located on the second floor they will not be segmented into the same sub network when taking into account the measured RTT values.

A reason for the client devices being located on a same floor not having the lowest RTTs may for instance be a misconfiguration of WiFi access points; the first floor might be wired with two different networks, e.g. corporate and guest. Different WiFi access points on the first floor might thus be wrongly connected to different networks.

In another scenario, instead of assuming that client devices are located on different floors, two networks (corporate and guests) are used on a particular premise, which are incorrectly assumed to be the same in terms of quality since they serve the same office building. However, in practice, the two networks are not connected with high speed links between them so from an application point of view, they should be considered as two logically separated networks.

As can be seen in FIG. 5, even though the fourth CD 31 are located on a different floor from the first CD 23 and the second CD 24, these three client devices are nevertheless segmented into the same sub network 33. As is understood, for a network spanning over multiple cities, countries or even continents, this will result in greatly improved network segmenting.

Advantageously, the invention implements a completely random overlay construction approach by removing any bias on the selection process from the set of peers/client devices available from the tracker, both at join time and periodically at peer selection time. The client devices will then typically transmit data to other randomly selected client devices in the form of a low quality data stream to trigger transfers between neighbours and obtain measurements of the links capacity. This allows for the procurement of unbiased random measurements between client devices.

Now, without the invention, in order to make an assessment as regards network topology, one would need to have access to a network "ground truth" in the form of for instance a set of network segments, each one defined as a list of subnets with IP ranges, and their geographical location. However, such network ground truth is rarely available at all, let alone kept updated over time. Further, this information is typically limited to network segments and offices' geographical location and lacks performances metrics like band width and latency between the different offices.

In embodiments of the invention, the connectivity performance metric used is throughput, i.e. rate of successful message delivery over a communication channel, or RTT, or a combination of the two (or any other appropriate connectivity performance metric). A further metric to be envisaged is IpSimilarity which indicates whether two client devices belong to the same subnet address range. If so, they are likely to have good link quality.

It is envisaged that the connectivity performance metric used is a combination, i.e. a weight, created from one or more of these three measures.

It is typical in enterprise networks to have full or semi-full connectivity between devices in the network. That is, a direct connection can be established between almost any pair of client devices in the network, with the exception of higher security segments which are either isolated from the rest of the network or only accessible from some particular location. Given their highly connected nature, the topology of enterprise networks cannot be established by looking only at what connections can or cannot be established between client devices but rather it is necessary to resort to performance indicators of those connections to understand how hosts should be segmented. In other words, it is necessary to rely on a single connectivity performance metric or a weighted combination of connectivity performance metrics, rather than if a connection between two client devices can be established.

Hence, the connectivity performance metric of the measured links can be represented by a weight function $f_w$ in order for the backend server to be able to map the client devices into segments, where a higher value of the weight function $f_w$ indicates that the two client devices communicating over the link are more likely to belong to the same network segment.

Experiments show that the most important metrics that correlate links within the same network segments appears to be (high) throughput and (low) RTT. The experiments further show that a combination of metrics appears to give more reliable practical results For instance, combining throughput and RTT clearly increases the quality of the segmenting even with limited number of link measurements. Further combining IpSimilarity with throughput and RTT can improve the quality of the segmenting. It is possible to collect this information from the host's private IP and subnet mask of the default network interface.

An example of four different weight function $f_w$:
$f_{w1}$=throughput,
$f_{w2}$=1/RTT,
$f_{w4}$=throughput/RTT, and
$f_{w4}$=throughput/RTT×IpSimilarity.

For $f_{w4}$, IpSimilarity may be set e.g. to 2 for links between client nodes within the same subnet, and to 1 for all others.

Figure 6:
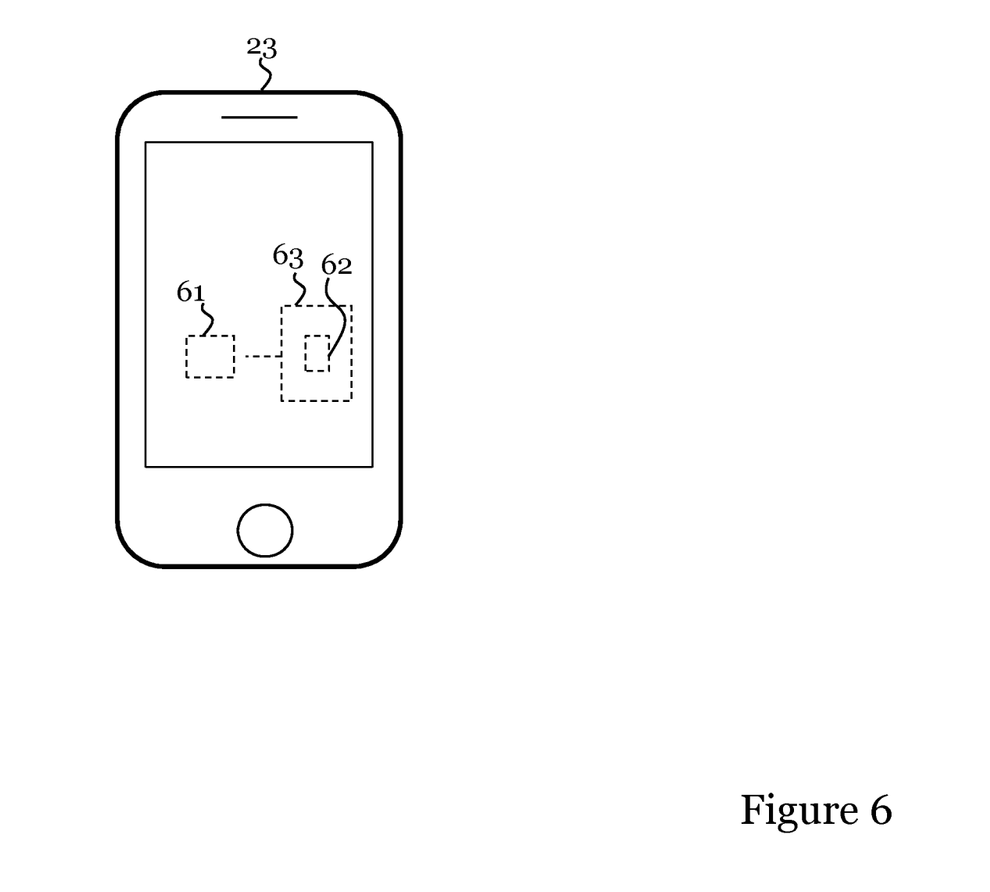
FIG. 6 illustrates a client device according to an embodiment.

FIG. 6 illustrates a client device 23 according to an embodiment. The steps of the method performed by the client device 23 according to embodiments of the invention are in practice performed by a processing unit 61 embodied in the form of one or more microprocessors arranged to execute a computer program 62 downloaded to the storage medium 63 associated with the microprocessor, such as a Random Access Memory (RAM), a Flash memory or a hard disk drive.

The processing unit 61 is arranged to cause the client device 23 to carry out the method according to embodiments of the present invention when the appropriate computer program 62 comprising computer-executable instructions is downloaded to the storage medium 63 and executed by the processing unit 61. The storage medium 63 may also be a computer program product comprising the computer program 62. Alternatively, the computer program 62 may be transferred to the storage medium 63 by means of a suitable computer program product, such as a Digital Versatile Disc (DVD) or a memory stick. As a further alternative, the computer program 62 may be downloaded to the storage medium 63 over a network. The processing unit 61 may alternatively be embodied in the form of a digital signal processor (DSP), an application specific integrated circuit (ASIC), a field-programmable gate array (FPGA), a complex programmable logic device (CPLD), etc.

Figure 7:
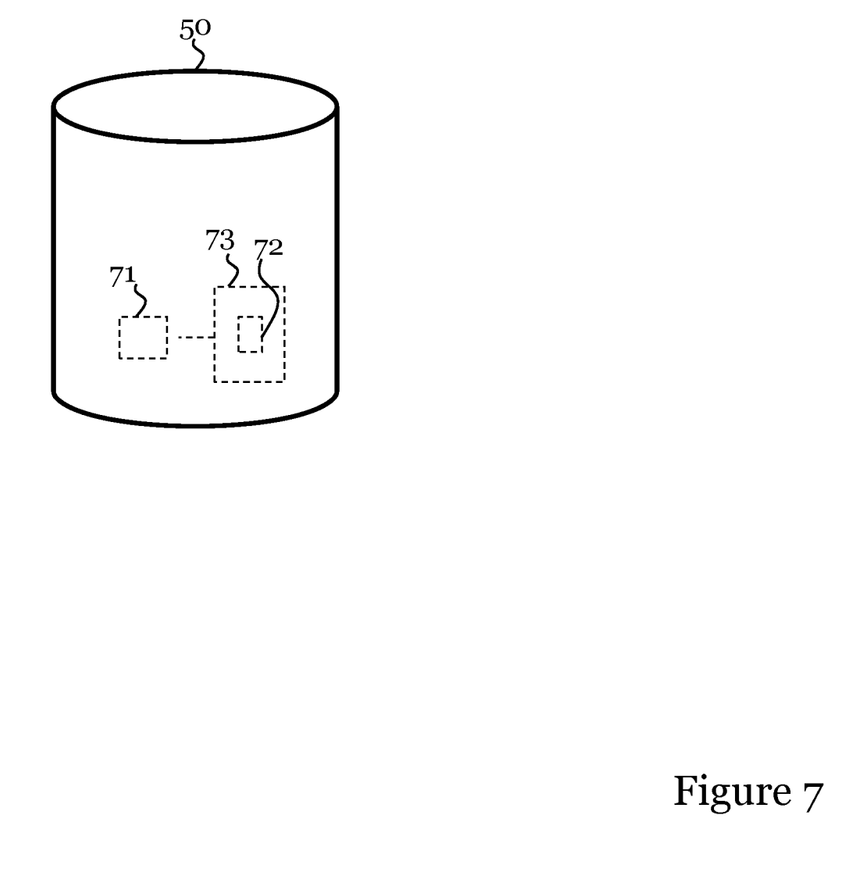
FIG. 7 illustrates a network device according to an embodiment.

FIG. 7 illustrates a network device 50 in the form of a backend server according to an embodiment. The steps of the method performed by the backend server 50 according to embodiments of the invention are in practice performed by a processing unit 71 embodied in the form of one or more microprocessors arranged to execute a computer program 72 downloaded to the storage medium 73 associated with the microprocessor, such as a RAM, a Flash memory or a hard disk drive.

The processing unit 71 is arranged to cause the backend server 50 to carry out the method according to embodiments of the present invention when the appropriate computer program 72 comprising computer-executable instructions is downloaded to the storage medium 73 and executed by the processing unit 71. The storage medium 73 may also be a computer program product comprising the computer program 72. Alternatively, the computer program 72 may be transferred to the storage medium 73 by means of a suitable computer program product, such as a DVD or a memory stick. As a further alternative, the computer program 72 may be downloaded to the storage medium 73 over a network. The processing unit 71 may alternatively be embodied in the form of a DSP, an ASIC, an FPGA, a CPLD, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a client device, of facilitating segmenting of a corporate communications network to which the client device is connected, the method comprising:
   transmitting data to at least one other randomly selected client device in the corporate communications network;
   measuring, based on the transmitted data, a value of a connectivity performance metric of a direct communication link over which the data is transmitted to said at least one other client device; and
   transmitting a measured value of a connectivity performance metric for the direct communication link to a network device configured to map the client device into a segment of the corporate communications network based on the measured value of the connectivity performance metric of the direct communication link.

2. The method of claim 1, wherein the connectivity performance metric comprises one or more of a data throughput of the direct communication link, a Round-Trip-Time ("RTT") of the direct communication link, and a measure indicating whether the client device and the at least one other randomly selected client device belong to a same sub network address range.

3. A method, performed by a network device, of segmenting a corporate communications network, the method comprising:
   receiving, from a plurality of client devices in the corporate communications network, a respective measured value of a connectivity performance metric of a direct communication link over which each of the plurality of client devices has transferred data to at least one other randomly selected client device of the plurality of client devices, and in which each of the plurality of client devices has measured the respective measured value based on the transferred data; and
   mapping the plurality of client devices into segments of the corporate communications network based on the respective measured value of the connectivity performance metric of each direct communication link, where at least two client devices of the plurality of client devices communicating over a direct communication link having a respective measured value exceeding a connectivity quality measure are mapped into a same segment.

4. The method of claim 3, wherein the connectivity performance metric comprises data throughput of the direct communication link, and the two client devices are mapped into the same segment if the data throughput exceeds a predetermined data throughput threshold value.

5. The method of claim 3, wherein the connectivity performance metric comprises a Round-Trip-Time ("RTT") of the direct communication link, and the at least two client devices are mapped into the same segment upon determining that the RTT is below a predetermined RTT threshold value.

6. The method of claim 3, wherein the connectivity performance metric comprises a measure indicating whether the two client devices communicating over a respective direct communication link belong to a same sub network address range, and the two client devices are mapped into the same segment upon determining that the two client devices belong to a same sub network address range.

7. The method of claim 3, wherein the connectivity performance metric comprises a combination of two or more of a data throughput of the direct communication link, a Round-Trip-Time ("RTT") of the direct communication link or a measure indicating whether two client devices belong to a same sub network address range or not.

8. A client device configured to facilitate segmenting of a corporate communications network to which the client device is connected, the client device comprising a processing unit and a memory, said memory containing non-transitory instructions executable by said processing unit, whereby, upon executing the instructions, the client device is operative to:
   transmit data to at least one other randomly selected client device;
   measure, based on the transmitted data, a value of a connectivity performance metric of a direct communication link over which the data is transmitted to said at least one other client device; and
   transmit a respective measured value of the respective connectivity performance metric for each direct communication link to a network device configured to map the client device into a segment of the corporate communications network based on the respective measured value of the respective connectivity performance metric of each direct communication link.

9. The client device of claim 8, wherein the connectivity performance metric comprises one or more of data throughput of the direct communication link, a Round-Trip-Time ("RTT") of the direct communication link, and a measure indicating whether the client devices communicating over the direct communication link belong to a same sub network address range or not.

10. A network device configured to segment a corporate communications network, the network device comprising a processing unit and a memory, said memory containing non-transitory instructions executable by said processing unit, whereby, upon executing the instructions, the network device is operative to:
    receive, from a plurality of client devices in the corporate communications network, a respective measured value of a respective connectivity performance metric of a direct communication link over which each of the plurality of client devices has transferred data to another randomly selected client device, and in which each of the plurality of client devices has measured the respective measured value based on the transferred data; and
    map the client devices into segments of the corporate communications network based on the respective measured value of the respective connectivity performance metric of each direct communication link, where client devices communicating the direct communication links having a measured value exceeding a connectivity quality measure are mapped into a same segment.

11. The network device of claim 10, wherein the connectivity performance metric comprises a data throughput of the direct communication link, and at least two of the client devices are mapped into the same segment upon determining that the respective data throughput exceeds a predetermined data throughput threshold value.

12. The network device of claim 10, wherein the connectivity performance metric comprises a Round-Trip-Time ("RTT") of the direct communication link, and at least two of the client devices are mapped into the same segment upon determining that the respective RTT is below a predetermined RTT threshold value.

13. The network device of claim 10, wherein the connectivity performance metric comprises a measure indicating whether at least two of the client devices communicating over a direct communication link belong to a same sub network address range or not, and the at least two of the client devices are mapped into the same segment if the at least two of the client devices belong to a same sub network address range.

14. The network device of claim 10, wherein the connectivity performance metric comprises a combination of two or more of a data throughput of the direct communication link, a Round-Trip-Time ("RTT") of the direct communication link or a measure indicating whether two client devices belong to a same sub network address range.

15. A system configured to segment a corporate communications network, which system comprises:
    at least one network device configured to segment the corporate communications network; and
    a plurality of client devices connected to the corporate network;
    wherein each of the plurality of client devices being configured to:
        transmit data to at least one other randomly selected client device in the corporate network,
        measure, based on the transmitted data, at each of the plurality of client devices, a respective value of a respective connectivity performance metric of a direct communication link over which the data is transmitted to said at least one other client device, and
        transmit the respective measured value of the respective connectivity performance metric for each direct communication link to the network device,
    wherein the at least one network device being configured to:
        map the client devices into segments of the corporate communications network based on the respective measured value of the respective connectivity performance metric of each direct communication link, where at least two client devices communicating over respective direct communication links having a respective measured value exceeding a connectivity quality measure are mapped into a same segment.

16. A non-transitory computer readable storage medium storing a computer program comprising computer-executable instructions configured to cause a device to perform at least the steps recited in claim 1 when the computer-executable instructions are executed on a processing unit included in the device.

17. A non-transitory computer readable storage medium storing a computer program comprising computer-executable instructions configured to cause a device to perform at least the steps recited in claim 3 when the computer-executable instructions are executed on a processing unit included in the device.

* * * * *